(12) United States Patent
Kessler et al.

(10) Patent No.: US 12,078,240 B2
(45) Date of Patent: Sep. 3, 2024

(54) TRANSMISSION FOR A MOTOR VEHICLE

(71) Applicant: ZF Friedrichshafen AG, Friedrichshafen (DE)

(72) Inventors: Andreas Kessler, Markdorf (DE); Johannes König, Friedrichshafen (DE); Nihat Güneş, Horgenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/009,468

(22) PCT Filed: May 10, 2021

(86) PCT No.: PCT/EP2021/062251
§ 371 (c)(1),
(2) Date: Dec. 9, 2022

(87) PCT Pub. No.: WO2021/249704
PCT Pub. Date: Dec. 16, 2021

(65) Prior Publication Data
US 2023/0243414 A1 Aug. 3, 2023

(30) Foreign Application Priority Data
Jun. 10, 2020 (DE) ............. 10 2020 207 252.3

(51) Int. Cl.
*F16H 57/04* (2010.01)
(52) U.S. Cl.
CPC ....... *F16H 57/045* (2013.01); *F16H 57/0409* (2013.01); *F16H 57/0421* (2013.01);
(Continued)

(58) Field of Classification Search
CPC ............. F16H 57/0408; F16H 57/0409; F16H 57/0421; F16H 57/0424; F16H 57/0447;
(Continued)

(56) References Cited

U.S. PATENT DOCUMENTS

| 1,220,810 A * | 3/1917 | Alquist | ............... F16H 57/0447 |
| | | | 184/6.12 |
| 8,456,045 B2 * | 6/2013 | Hayashi | ................ B60L 3/0061 |
| | | | 310/113 |

(Continued)

FOREIGN PATENT DOCUMENTS

| DE | 1047820 B | * 12/1958 |
| DE | 102005005154 A1 | 8/2006 |

(Continued)

OTHER PUBLICATIONS

International Search Report (English translation) PCT/EP2021/062251, dated Jul. 28, 2021. (2 pages).

*Primary Examiner* — Adam D Rogers
(74) *Attorney, Agent, or Firm* — Dority & Manning, P.A.

(57) ABSTRACT

A transmission (1) for a motor vehicle (2) includes a transmission housing (3) with an interior space (4) and an oil sump (6). At least one rotating transmission component (5a) is arranged in the interior space (4) of the transmission housing (3). At least one compensating tank (7) is configured for collecting oil from the interior space (4). The compensating tank (7) is fluidically connected to the oil sump (6) via at least one return (8). The particular return (8) delivers a predefined flow back into the oil sump (6) as a function of a power throughput of the transmission (1).

14 Claims, 2 Drawing Sheets

(52) U.S. Cl.
CPC ..... *F16H 57/0447* (2013.01); *F16H 57/0449* (2013.01); *F16H 57/0452* (2013.01)

(58) Field of Classification Search
CPC .............. F16H 57/0449; F16H 57/045; F16H 57/0453; F16H 57/0457
See application file for complete search history.

(56) References Cited

U.S. PATENT DOCUMENTS

| | | | |
|---|---|---|---|
| 8,746,405 B2 * | 6/2014 | Perakes | F16H 57/0409 |
| | | | 184/6.12 |
| 9,377,099 B2 | 6/2016 | Gianone et al. | |
| 9,739,363 B2 * | 8/2017 | Schweiher | F16H 57/0457 |
| 9,897,192 B2 * | 2/2018 | Tahara | F16H 57/0421 |
| 10,451,170 B2 * | 10/2019 | Arnelöf | F16H 57/0447 |
| 11,181,181 B1 * | 11/2021 | Zhou | F16H 57/0413 |
| 2015/0345616 A1 | 12/2015 | Schweiher et al. | |

FOREIGN PATENT DOCUMENTS

| | | | | |
|---|---|---|---|---|
| DE | 102005013657 A1 * | 9/2006 | ......... | F16H 57/0434 |
| DE | 102008063608 A1 * | 7/2009 | ......... | F16H 57/0413 |
| DE | 102014107659 A1 | 12/2015 | | |
| DE | 102016216823 A1 | 3/2018 | | |
| EP | 1918613 B1 | 1/2010 | | |
| GB | 681298 A * | 10/1952 | | |
| JP | H0854053 A * | 6/1996 | | |
| JP | 2005201316 A * | 7/2005 | ......... | F16H 57/0447 |
| JP | 2008089134 A * | 4/2008 | ......... | F16H 57/0421 |
| WO | WO-2019011798 A1 * | 1/2019 | ............ | F16H 57/04 |

\* cited by examiner

TRANSMISSION FOR A MOTOR VEHICLE

CROSS-REFERENCE TO RELATED APPLICATIONS

The present application is related and claims priority to 102020207252.3 filed in the German Patent Office on Jun. 10, 2020 and to PCT/EP2021/062251 filed in the European Patent Office on May 10, 2021, both of which are incorporated by reference in their entirety for all purposes.

FIELD OF THE INVENTION

The invention relates to a transmission for a motor vehicle. The invention further relates to a motor vehicle that includes a transmission of this type.

BACKGROUND

A housing of a transmission of a motor vehicle results from DE 10 2016 216 823 A1, the housing including a first area, which is essentially cylindrical and accommodates rotating transmission components, and a second area, which is entirely or partially partitioned off from the first area and is open toward an oil pan. Switching and control mechanisms for hydraulically actuatable components of the transmission are arranged in the open area. An area functioning as an oil reservoir is provided, the area being fluidically connected to the first area on the one hand and to the oil pan on the other hand. The fluidic connection of the oil reservoir to the first area takes place in that the first area has at least one outlet opening, through which lube oil from the first area is deliverable to the oil reservoir by utilizing the centrifugal force effect due to the rotating transmission components. For the purpose of fluidically connecting the oil reservoir to the oil pan, the oil reservoir has openings, through which the lube oil is deliverable to the oil pan via the second area. The at least one outlet opening is provided with a membrane, the permeability of which depends on the temperature-dependent viscosity of the lube oil, such that cold, viscous lube oil sticks to the membrane and warm lube oil flows through the membrane into the oil reservoir.

SUMMARY OF THE INVENTION

Example aspects of the present invention provide a transmission for a motor vehicle, within which an oil level of the transmission is adjustable depending on the operating state.

A transmission for a motor vehicle according to example aspects of the invention includes a transmission housing, in the interior space of which at least one rotating transmission component is arranged and an oil sump is formed, wherein at least one compensating tank is provided, which is configured for collecting oil from the interior space, wherein the compensating tank is fluidically connected to the oil sump via at least one return, and wherein the particular return delivers a predefined flow back into the oil sump as a function of a power throughput of the transmission. In other words, the transmission is formed at least having a splash lubrication, and also has aspects of a dry-sump lubrication. In the process, the particular transmission component, which is designed, for example, as a spur gear or a bevel gear, dips into the oil sump filled with oil, such that the immersed surface of the particular transmission component is wetted with oil. As a result, the oil can absorb heat and lubricate a meshing engagement when at least one further transmission component is provided in addition to the first transmission component, the at least one further transmission component meshing with the first transmission component. The advantage of the splash lubrication is, essentially, the simple configuration and the low number of components. In this way, in particular, additional oil pumps can be dispensed with.

The term "oil" is to be understood to mean a lube oil or a lubricant, which lubricates the mutually interacting components in the transmission and simultaneously achieves a cooling effect due to heat absorption and dissipation.

During the operation of the transmission, oil spray also arises due to centrifugal forces, the oil spray reaching further lubrication points of the transmission, for example, bearings, via the particular rotating transmission component for the purpose of lubrication and/or cooling. Moreover, oil spray is delivered into the particular compensating tank in which the excess oil is retained and is delivered back into the oil sump according to the cross-section of the particular return. The return has a defined cross-section, which is either designed to be constant or of equal size across the entire length of the return or changes across the length of the return. The cross-section of the particular return is selected on the basis of the necessary cooling demand of the transmission, in particular on the basis of the required operational reliability of the transmission and/or the properties of the oil. Properties of the oil are to be understood to mean, for example, the viscosity indicators and the flow properties.

The particular compensating tank is fluidically connected to the interior space of the transmission housing via an opening, wherein, when more oil enters the compensating tank than flows back into the oil sump via the return, the oil level in the interior space of the transmission housing drops. The particular opening is preferably formed at strongly wetted points of the transmission housing. The lower the oil level drops, the lesser is the amount of oil delivered into the compensating tank as oil spray, such that, in particular in constantly running transmissions, an equilibrium is established, in which as much oil is delivered into the compensating tank as flows back into the oil sump via the particular return. In other words, the oil level within the transmission is self-regulating, wherein the oil level within the transmission is adjustable in a way which is appropriate to the situation. The oil level is essentially dependent on the rotational speed of the particular transmission component and also on the viscosity of the oil or of the lubricant.

In particular in the resting state of the transmission, i.e., when the particular transmission component does not rotate, according to one exemplary embodiment, all oil flows into the oil sump via the particular return and increases the oil level in the transmission housing to a maximum, wherein the oil level in the compensating tank drops to a minimum, in particular runs empty. In order to ensure this and/or to enable a complete oil circulation in the system, an outlet of the compensating tank connected to the particular return is arranged above the oil sump in the direction of gravity. At the start of the turning motion of the particular rotating transmission component, initially, due to the high oil level in the oil sump, a high amount of oil is delivered as oil spray into the particular compensating tank and buffered there, wherein a controlled and, in this case, constant amount of oil is directed back into the oil sump via the particular return, the constant amount of oil being lower at the beginning of the operation than the amount of oil in the particular compensating tank. As a result, the oil level drops, as described above, until the system reaches an equilibrium. It is advantageous that losses, for example, due to churning, are minimized.

If the power throughput is increased, i.e., if the rotational speed and/or the applied or transmitted torque of the particular transmission component are/is increased and, due to associated power losses, the component temperature and, consequently, the oil temperature therefore increase, the viscosity of the oil drops, such that the oil is thinner than at a lower oil temperature. As a result, the oil flows considerably faster back into the oil sump via the return, and therefore the oil level in the oil sump rises again, which in turn improves the wetting of the particular rotating transmission component and, finally, the cooling effect. An equilibrium is also established in this case, as the result of which losses, for example, due to churning, are minimized due to the oil level that is adapted as a function of the operating state.

The effective, self-regulating oil level is therefore a function of the amount of oil returned. The greater the amount returned to the oil sump is, the higher the oil level in the oil sump becomes. Conversely, if the oil level drops, the lesser is the amount that flows from the particular compensating tank back into the oil sump.

Another advantage of the use of a compensating tank for buffering amounts of oil and of a particular return fluidically connected to the oil sump for the controlled delivery of oil into the oil sump is that the total amount of oil present in the system only slightly affects the oil level in the interior space of the transmission housing. The entire amount of oil required, including a reserve, can be arbitrarily selected, in principle, since a rapid adaptation of the required oil level in the oil sump is achieved due to a suitable adjustment of the return cross-section, in particular at the beginning of an operation of the transmission or when changes in load throughput occur. This ensures, on the one hand, a sufficient lubrication and cooling of the transmission and of the mutually interacting transmission components and also minimizes churning losses. In addition, a sufficient oil reserve is maintained in the case of oil loss by leakage, without increasing the churning losses during operation.

Preferably, a valve is arranged at the particular return. The valve is preferably designed for changing the flow to be delivered to the oil sump as a function of the power throughput of the transmission. The valve can also change the flow as a function of further factors, such as, for example, the ambient temperature or the oil level, i.e., the performance of the oil. The valve is configured, in particular, for controlling, by way of an open-loop or closed-loop system, an oil return from the particular compensating tank to the oil sump regardless of the return cross-section. An open-loop control of the flow is to be understood in this context to mean that the valve either blocks or releases a flow. In other words, the valve is switchable between a completely open condition and a completely closed condition. Moreover, it is conceivable to design the valve in such a way that partially open conditions can also be achieved. In this sense, the valve is preferably designed as a pulsed valve. In particular, it is conceivable to design the valve as a pulsed SW valve. By such valves, production and/or operating costs of the transmission can be reduced, wherein a simple and controlled open-loop control of the flow is simultaneously achievable.

Alternatively, the valve is designed as a proportional valve. By a proportional valve, the amount of oil per unit of time or the flow between a completely open condition and a completely closed condition can be arbitrarily controlled by way of a closed-loop system. In other words, any flow between zero percent (0%) and one hundred percent (100%) can be set.

The valve can be designed such that the valve, in the resting state, switches into a closed condition in order to avoid draining the compensating tank, so that the oil level in the oil sump is lower at the beginning than when all the oil has collected in the oil sump at the beginning of operation.

Preferably, the flow is adjustable as a function of a rotational speed and/or a torque of the particular rotating transmission component and/or as a function of an oil temperature. In other words, the amount of oil returning can be regulated according to demand, i.e., as a function of an operating state of the motor vehicle or of the transmission, wherein the adjustment of the amount of oil takes place on the basis of a parameter characteristic map, which can be stored on a valve control unit. The valve control unit can communicate with an engine control unit in a suitable way, in particular retrieve engine performance data, in order to receive and process information regarding the current power throughput and/or the current drive power. Moreover, data regarding power losses of the engine can be processed. In this way, for example, high losses can result in an opening of the valve in order to increase or to improve the oil level in the oil sump and, as a result, the cooling effect. Low losses can in turn require that the valve allow lower amounts of oil to flow through the return into the oil sump in order to lower the oil level and, as a result, the churning losses.

Preferably at least one temperature sensor is arranged in the area of the oil sump for the more precise open-loop control or closed-loop control of the particular valve. By the particular temperature sensor, precise measured data on the current oil temperature in the oil sump can be obtained, by which inferences regarding power losses can be drawn.

According to one exemplary embodiment, the particular compensating tank is arranged within the transmission housing. Consequently, the compensating tank is part of a continuous lubrication system, which is combined in the transmission housing.

Alternatively, the particular compensating tank is connected to the interior space of the transmission housing via an opening formed at the transmission housing. In other words, the particular compensating tank is a separate, external compensating tank, which, sealed with suitable means, is connected to the transmission housing. For this purpose, the compensating tank as well as the transmission housing both have a particular essentially aligned opening, such that the compensating tank can collect the oil spray from the transmission housing. In addition, the particular return connected to the compensating tank includes suitable means for the secure connection to the oil sump of the transmission housing, so that the oil collected in the particular compensating tank can be directed back into the oil sump in a controlled manner in the form of an oil circuit.

According to another example aspect of the invention, a motor vehicle is provided. The vehicle has a drive train that includes a transmission of the above-described type. The motor vehicle can be a transport vehicle, which is used, for example, in logistics centers, in agriculture, or in the automotive industry.

The aforementioned definitions and comments presented with respect to technical effects, advantages, and advantageous example embodiments of the transmission also apply similarly for the motor vehicle according to the second example aspect of the invention.

BRIEF DESCRIPTION OF THE DRAWINGS

Exemplary embodiments of the invention are explained in greater detail in the following with reference to the schematic drawings, wherein identical or similar elements are labeled with the same reference character, wherein.

DETAILED DESCRIPTION

Figure 1:
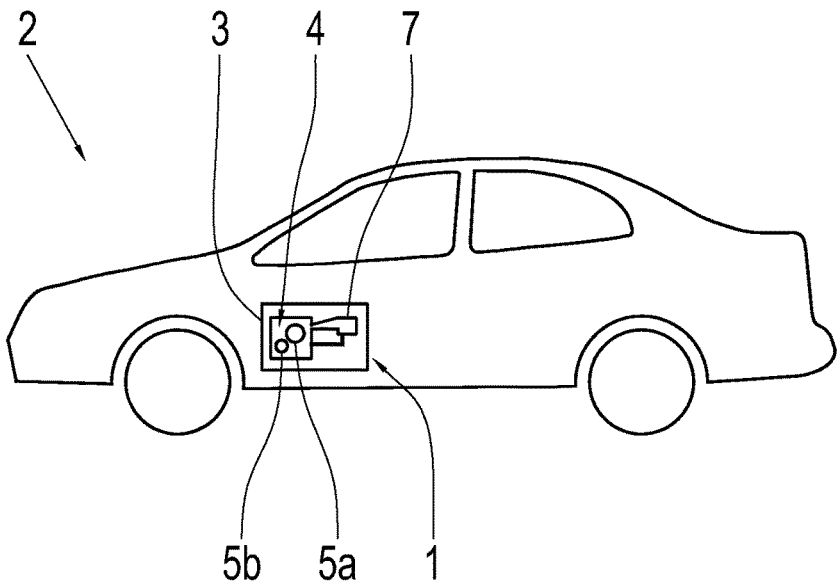
FIG. 1 shows a schematic view of a motor vehicle according to example aspects of the invention that includes a transmission according to example aspects of the invention, according to a first exemplary embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 2, which has a transmission 1 that includes a transmission housing 3. Two transmission components 5a, 5b operatively connected to each other are arranged in the interior space 4 of the transmission housing 3. In the present case, the transmission components 5a, 5b are two gearwheels in mesh with each other, as shown in FIG. 2 through FIG. 4.

Figure 2:
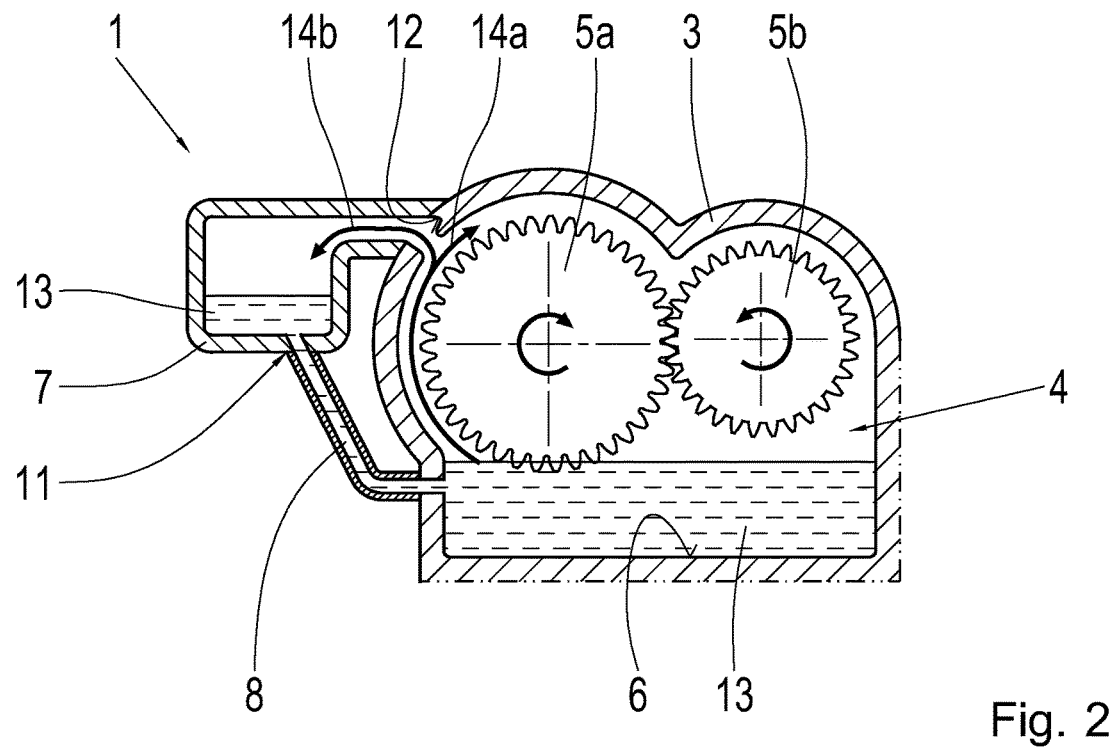
FIG. 2 shows a schematic cross-sectional view of the transmission according to example aspects of the invention, according to FIG. 1.
Figure 3:
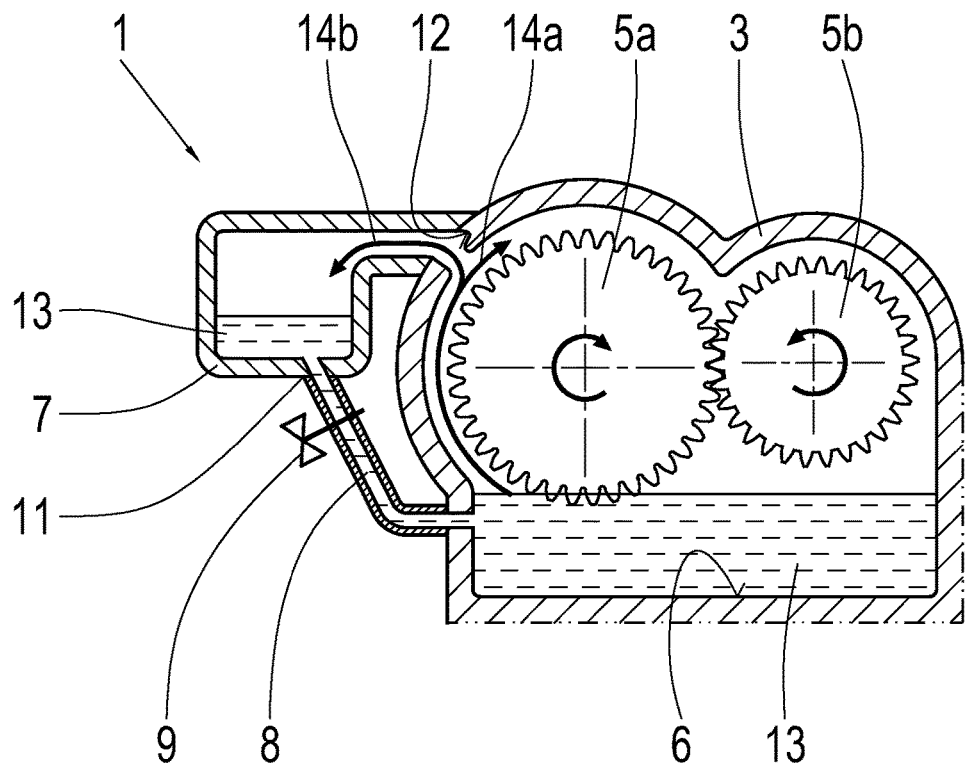
FIG. 3 shows a schematic cross-sectional view of the transmission according to example aspects of the invention, according to a second exemplary embodiment.
Figure 4:
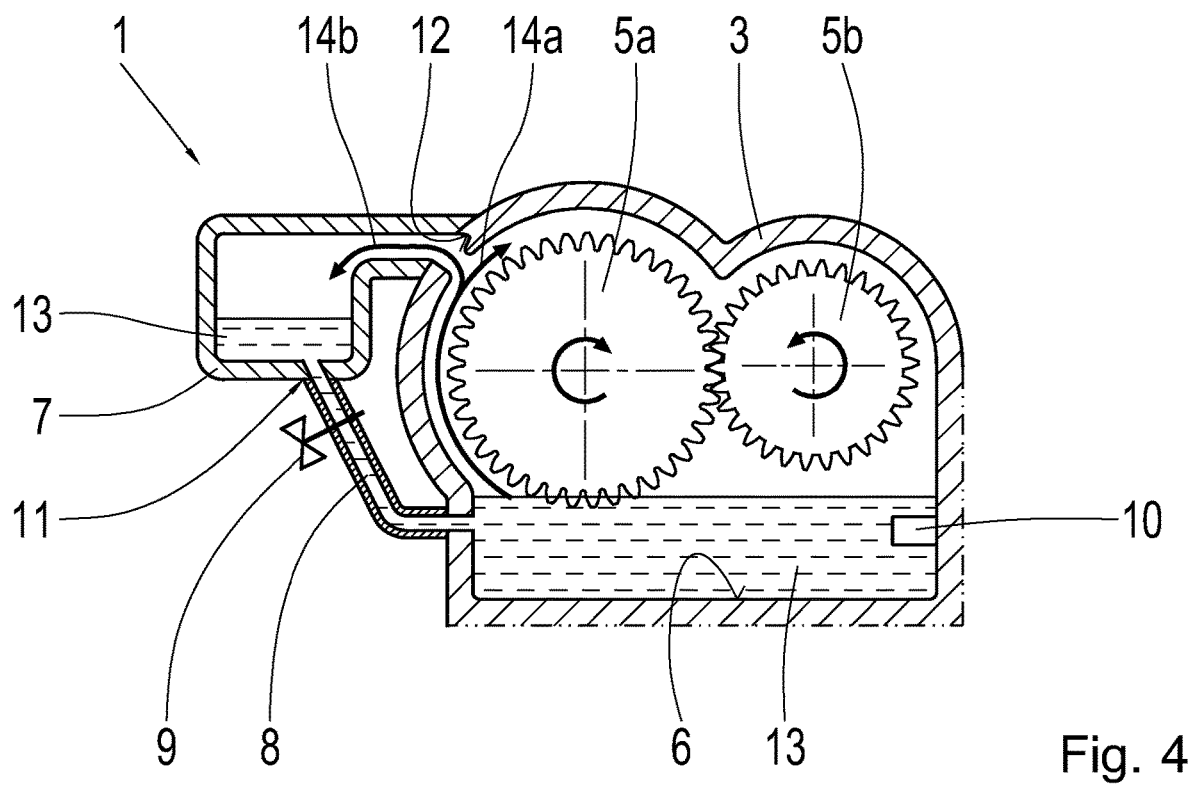
FIG. 4 shows a schematic cross-sectional view of the transmission according to example aspects of the invention, according to a third exemplary embodiment.

According to FIG. 2 through FIG. 4, moreover, an oil sump 6 for receiving and for retaining oil 13 is formed in the interior space 4 of the transmission housing 3. The first transmission component 5a partially dips into the oil 13 retained in the oil sump 6 for splash lubrication. The interior space 4 is also fluidically connected to a compensating tank 7 via an opening 12. During the operation of the transmission 1, the first transmission component 5a is wetted with oil 13 at a surface of the first transmission component 5a. Due to the centrifugal forces arising during a rotation of the first transmission component 5a, oil 13 is carried along by the first transmission component 5a in the circumferential direction of the first transmission component 5a according to the arrows 14a, 14b. A first portion of the oil 13 according to the first arrow 14a is used for lubricating the toothing between the transmission components 5a, 5b and an excess, second portion of the oil 13 according to the second arrow 14b is slung radially outward as oil spray. Oil passes through the opening 12 and is collected in the compensating tank 7. In other words, the compensating tank 7 and, in particular, the opening 12 are arranged with respect to the interior space 4 such that oil 13 from the interior space 4 of the transmission housing 3 is collected.

The compensating tank 7 has an outlet 11, which is arranged at the lowest point of the inner volume of the compensating tank 7 and is connected to a return 8. The return is configured for fluidically connecting the compensating tank 7 to the oil sump 6, as the result of which an oil circuit is formed. The outlet 11 of the compensating tank 7 connected to the return 8 is arranged above the oil sump 6 in the direction of gravity so that the oil 13 from the compensating tank 7 returns to the oil sump 6 already solely due to gravity and, thus, without an additional oil pump.

According to the first exemplary embodiment according to FIG. 1 and FIG. 2, the particular compensating tank 7 is arranged together with the return 8 within the transmission housing 3. The return 8 has a constant cross-section along the entire length of the return 8, the cross-section being adapted to the characteristic properties of the oil 13.

In the resting state of the transmission 1, i.e., when the transmission components 5a, 5b are not rotating, all the oil 13 is located in the oil sump 6. The oil 13 remaining in the compensating tank 7 also flows back into the oil sump 6 via the return 8. Therefore, a maximum volume of oil or a maximum oil level is present in the oil sump 6. If an operation of the transmission 1 is started and the transmission components 5a, 5b are set into rotation, the first transmission component 5a carries along a comparatively large amount of oil and distributes the oil 13 in the transmission housing 3 in the above-described way, wherein a portion of the oil 13 enters the compensating tank 7. Simultaneously, a portion of the oil 13 from the compensating tank 7 is delivered back into the oil sump 6 as a function of the cross-section of the return 8, so that an oil surplus in the compensating tank 7 is achieved, in particular, at the beginning of the operation of the transmission 1. Consequently, the oil level in the oil sump 6 drops until the system enters an equilibrium, in which the same amount of oil is delivered into the oil sump 6 via the return 8 as enters the compensating tank 7 as oil spray due to the rotation of the first transmission component 5a. In other words, a certain amount of oil is buffered or stored in the compensating tank 7 during the operation of the transmission 1, the certain amount of oil being returned to the oil sump 6 in a controlled manner as a function of the cross-section of the return 8, the rotational speed of the first transmission component 5a, and the oil temperature. The return 8 therefore delivers a defined flow back into the oil sump 6 as a function of a power throughput or an operating state of the transmission 1. Consequently, churning losses are minimized when the system is in equilibrium.

If, for example, a higher power throughput is required due to a corresponding driver input and, as a result, the rotational speed of the transmission components 5a, 5b increases, the oil temperature within the transmission 1 increases due to power losses. Due to the rising oil temperature, the viscosity of the oil 13 decreases, such that the oil 13 flows back into the oil sump 6 via the return 8 considerably faster than at a lower power throughput. As a result, the oil level in the oil sump 6 initially rises, as the result of which, due to the greater volume of oil available in the oil sump 6, the wetting of the rotating transmission components 5a, 5b and, finally, the cooling effect in the system are improved. Due to the higher rotational speed of the transmission components 5a, 5b, more oil spray enters the compensating tank 7 and is buffered there, such that, also after the increase of the power throughput, an equilibrium is established, in which, in particular, churning losses are minimized. Therefore, an amount of oil that is optimal for the particular power throughput is always present in the oil sump regardless of the total amount of oil present in the system, wherein the remaining oil 13 is retained in the compensating tank 7.

According to the second exemplary embodiment according to FIG. 3, the particular compensating tank 7 is arranged together with the return 8 within the transmission housing 3. The only difference from the first exemplary embodiment according to FIG. 1 and FIG. 2 is that a valve 9 designed as a proportional valve is arranged at the return 8. The valve 9 is configured for arbitrarily changing or adapting the flow to be delivered to the oil sump 6 as a function of a power throughput of the transmission 1, an ambient temperature, and/or an oil state.

The valve 9 is monitorable by a control unit (not shown here), on which at least one parameter characteristic map is stored, by which the flow is adjustable as a function of a rotational speed and/or a torque of the rotating transmission components 5a, 5b. The control unit can also receive and evaluate engine performance data of the motor vehicle for this purpose, in order, for example, to generate information regarding power losses. The valve 9 is arbitrarily adjustable between an open condition and a closed condition on the basis of the information. Therefore, the amount of oil to be delivered in the oil sump 6 can also take place essentially regardless of the viscosity of the oil 13. Alternatively, the valve 9 can also be designed as a pulsed valve.

The transmission 1 according to the third exemplary embodiment according to FIG. 4 is designed essentially identical to the second exemplary embodiment according to FIG. 3. The only difference is that the transmission 1 is formed at least as two pieces, wherein the compensating tank 7 is removably arranged at the transmission housing 3. In the present case, the compensating tank 7 is designed as a separate component, which is connected to the interior space 4 of the transmission housing 3 via an opening 12 formed at the transmission housing 3. In contrast to the return duct according to FIG. 2 and FIG. 3, the return 8 is also designed as a return line or hose and is fluidically connected to the oil sump 6 via mechanisms (not shown here in greater detail).

Moreover, the control unit mentioned with reference to FIG. 3 can receive and evaluate measured data of a temperature sensor 10, which is arranged in the oil sump 6 of the transmission 1. Therefore, the valve 9 is also configured for adjusting the flow as a function of an oil temperature of the oil 13 located in the oil sump 6.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 transmission
2 motor vehicle
3 transmission housing
4 interior space of the transmission housing
5a first transmission component
5b second transmission component
6 oil sump
7 compensating tank
8 return
9 valve
10 temperature sensor
11 outlet of the compensating tank
12 opening of the transmission housing
13 oil
14a first arrow
14b second arrow

The invention claimed is:

1. A transmission (1) for a motor vehicle (2), comprising a transmission housing (3) with an interior space (4) and an oil sump (6);
    at least one rotating transmission component (5a) arranged within the interior space (4) of the transmission housing (3);
    at least one compensating tank (7) configured for collecting oil from the interior space (4) of the transmission housing (3), the at least one compensating tank (7) fluidically connected to the oil sump (6) via at least one return (8); and
    a valve (9) arranged at the at least one return (8),
    wherein the return (8) delivers a predefined oil flow back into the oil sump (6) as a function of a rotational speed and a torque of the at least one rotating transmission component (5a) during operation of the transmission (11) via opening of the valve (9), and
    wherein the valve (9), in a resting state when the at least one transmission component (5a) is not rotating, switches into a closed condition in order to limit draining of the at least one compensating tank (7).

2. The transmission (1) of claim 1, wherein the valve (9) is a proportional valve.

3. The transmission (1) of claim 2, wherein the oil flow back into the oil sump (6) is adjustable as a function of an oil temperature.

4. The transmission (1) of claim 3, further comprising at least one temperature sensor (10) arranged at the oil sump (6).

5. The transmission (1) of claim 1, wherein the valve (9) is a pulsed valve.

6. The transmission (1) of claim 5, wherein the oil flow back into the oil sump (6) is adjustable as a function of an oil temperature.

7. The transmission (1) of claim 6, further comprising at least one temperature sensor (10) arranged at the oil sump (6).

8. The transmission (1) of claim 1, wherein an outlet (11) of the at least one compensating tank (7) connected to the at least one return (8) is arranged above the oil sump (6) in a direction of gravity.

9. The transmission (1) of claim 8, wherein the at least one compensating tank (7) is connected to the interior space (4) of the transmission housing (3) via an opening (12) formed at the transmission housing (3).

10. The transmission (1) of claim 1, wherein the at least one compensating tank (7) is arranged within the transmission housing (3).

11. A motor vehicle (2) comprising the transmission (1) of claim 1.

12. The transmission (1) of claim 1, wherein the valve (9), in the resting state when the at least one transmission component (5a) is not rotating, limits draining of the at least one compensating tank (7) such that an oil level in the oil sump is lower at a beginning of the operation of the transmission (1) than when all oil has collected in the oil sump.

13. The transmission (1) of claim 1, wherein the valve (9), in the resting state when the at least one transmission component (5a) is not rotating, retains oil in the at least one compensating tank (7) to reduce churning losses at a beginning of the operation of the transmission (1).

14. The transmission (1) of claim 1, wherein:
the valve (9) is configured to close in response to the transmission (1) adjusting to the resting state; and
the valve (9) is configured to adjust oil flow through the return (8) to the predefined oil flow as the function of the rotational speed and the torque of the at least one rotating transmission component (5a) only during operation of the transmission (1).

* * * * *